US007468987B1

(12) United States Patent
Bennett et al.

(10) Patent No.: US 7,468,987 B1
(45) Date of Patent: Dec. 23, 2008

(54) METHOD AND APPARATUS FOR DETECTING A DS3 FRAME FORMAT

(75) Inventors: Marc A. Bennett, Austin, TX (US); Harris Wongsonegoro, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 1097 days.

(21) Appl. No.: 10/435,530

(22) Filed: May 9, 2003

(51) Int. Cl.
*H04J 3/16* (2006.01)
*H04J 3/22* (2006.01)

(52) U.S. Cl. ....................... 370/465; 370/470; 370/471; 370/473; 370/474; 375/340

(58) Field of Classification Search ................. 370/438, 370/255, 358, 356, 465, 473
See application file for complete search history.

(56) References Cited

U.S. PATENT DOCUMENTS 5,511,077 A * 4/1996 Shimada ..................... 370/505
5,553,056 A 9/1996 Bronte et al. ................. 370/13
5,557,616 A * 9/1996 Cadieux et al. ............. 370/509
5,619,532 A * 4/1997 Tani et al. ................... 375/224
5,621,720 A 4/1997 Bronte et al. ................. 370/13
5,666,547 A * 9/1997 James et al. .................. 710/58
6,188,701 B1 * 2/2001 Tsukamoto et al. ......... 370/535
6,233,225 B1 5/2001 Antonello et al. ........... 370/251
6,240,087 B1 5/2001 Cummings et al. .......... 370/360
6,275,499 B1 8/2001 Wynn et al. ................. 370/438
6,285,673 B1 9/2001 Blackburn et al. .......... 370/360
6,363,078 B1 3/2002 Garcia et al. ................ 370/438
6,587,527 B1 * 7/2003 Tani et al. ................... 375/357
6,625,167 B1 * 9/2003 Hasani ........................ 370/466
6,654,368 B1 * 11/2003 Smith et al. ................. 370/376
6,674,855 B1 * 1/2004 Karelic et al. ............... 379/386
6,717,958 B1 * 4/2004 Kim ........................... 370/506
6,973,072 B1 * 12/2005 Muntz ........................ 370/351
7,036,070 B1 * 4/2006 Ozdemir ..................... 714/801
2003/0088726 A1 * 5/2003 Dillabough et al. ......... 710/305
2003/0179712 A1 * 9/2003 Kobayashi et al. .......... 370/249
2003/0219076 A1 * 11/2003 Jeong et al. ................. 375/260

FOREIGN PATENT DOCUMENTS

KR 2002-0033906 * 5/2002

OTHER PUBLICATIONS www.protocols.com/pbook/ds3.htm, "DS-3 ATM Physical Interface", May 6, 1999, p. 1.*
http://www.teracomm.com/appnotes/whitepapers/DS3 Fundamentals.pdf, "The Fundamentals of DS3", 1999, Acterna (TTC, a division of Dynatech, LLC).*

* cited by examiner

*Primary Examiner*—Nick Corsaro
*Assistant Examiner*—Allahyar Kasraian
(74) *Attorney, Agent, or Firm*—Aka Chan LLP

(57) ABSTRACT

Methods and apparatus for identifying a frame format associated with a DS3 data signal are disclosed. According to one aspect of the present invention, a method for detecting a frame format of a signal which has a plurality of frames includes receiving a first frame and determining when a parity associated with the first frame and a first bit associated with the first frame indicate that a first counter is to be incremented. The first counter is incremented when it is determined that the first counter is to be incremented. The method also includes determining when the signal is of a first format through a comparison of the first counter with a first threshold.

8 Claims, 11 Drawing Sheets

METHOD AND APPARATUS FOR DETECTING A DS3 FRAME FORMAT

BACKGROUND OF THE INVENTION

1. Field of Invention

The present invention relates generally to data communication systems. More particularly, the present invention relates to systems and methods for accurately determining the frame format of a DS3 signal.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

DS3 traffic is a prevalent type of traffic in large networks. A DS3 signal generally has a bandwidth of approximately 44.736 megabits per second (Mbps), and may carry twenty-eight DS1 signals. DS3 line cards which support DS3 traffic allow routers within a network to be connected to high-speed DS3 leased line services. In general, DS3 line cards include ports that are used to receive DS3 signals.

A DS3 signal generally includes multiple frames which contain series of bits that are arranged as rows of data. FIG. 1 is a diagrammatic representation of a frame of a DS3 signal. A frame 100 in a DS3 signal includes 4760 bits that are divided into seven rows 104, or subframes, of data. The bits included in frame 100 include overhead bits 106, 109, 110 and payload bits. Payload bits include sets 108 of information bits. Typically, each set 108 of information bits includes eighty-four bits. Overhead bits 106, 109, 110 include frame boundary bits which enable payload bits to be extracted from frame 100 correctly. Frame 100 includes twenty-eight F-bits 109 and twenty-one C-bits 110, the latter of which may be used as stuff control bits for an M23 framing format to indicate how bits are stuffed in a frame, as will be appreciated by those skilled in the art. In other words, C-bits 110 may identify the contents of M23 stuff bits. C-bits 110 may also be used as parity bits, far-end alarming bits, remote loop back bits, and far-end error bits. F-bits 109 are framing bits which are needed to synchronized to a DS3 frame structure.

DS3 signals typically have three possible frame or framing formats, namely a C-Bit parity or C-Bit format, an M23 format, or an unframed format. A signal with a C-bit frame format generally uses C-bits, i.e., C-bits 110 of FIG. 1, to provide path parity information, as well as both local and remote alarm and control, including the ability to initiate remote loops. A signal of an M23 format generally includes a multiplexed scheme which provides for transmission of seven DS2 channels.

Properly identifying a frame format for a DS3 signal or DS3 traffic is generally necessary in order to enable a port on which the DS3 signal is to be received to be properly configured. When a port is configured or provisioned incorrectly, the payload of received frames may be corrupted as some bits may be interpreted as being payload bits when those bits are not part of the payload. By way of example, as part of C-bit usage, a frame that is of a C-Bit format generally includes a far-end loopback mechanism, while a frame that is of an M23 format does not use a loopback mechanism as a part of C-bit usage. Hence, provisioning a port to expect a signal of a C-Bit format when a signal of an M23 format is received may result in the signal being misread.

Typically, a first C-bit in a DS3 frame is considered to be an application identification (AIC) bit. In general, a standards compliant DS3 signal will have the AIC bit set to a value of '1' when the DS3 signal is of a C-bit frame format, and set to a value of '0' when the DS3 signal is of an M23 frame format. Hence, many systems may base an identification of a frame format upon the value of an AIC bit. FIG. 2 is a block diagram which illustrates a process of identifying a frame format of a DS3 signal. A frame format detection mechanism 202, which may be associated with a line card that is arranged to support DS3 signals, takes fixed overhead bits 204 as input. The fixed overhead bits 204 typically include the AIC bit. Using fixed overhead bits 204, frame format detection mechanism 202 provides a classification of a DS3 signal type 206 as an output.

With reference to FIG. 3, the steps associated with one conventional process of determining a DS3 frame format will be described. A process 300 of determining a DS3 frame format begins at step 302 in which F-bits and M-bits are obtained from a DS3 signal frame, or a frame included in a DS3 signal. More specifically, bits which are located in "standard" F-bit and M-bit locations are obtained. A determination is then made in step 304 as to whether the F-bits and the M-bits indicate that the frame format of the signal indicates that the signal is of an unframed format. As will be appreciated by those skilled in the art, the F-bits may be examined to determine if there is a repeating '1001' pattern. When there is a repeating '1001' pattern of the F-bits, then the M-bits may be examined to determine if there is a repeating '010' pattern. If the F-bits do not have a repeating '1001' pattern, then the indication is that the signal is of an unframed format. Accordingly, the signal is processed in step 306 as having an unframed format. Once the signal is processed as having an unframed format, the process of determining a DS3 frame format is completed.

When it is determined in step 304 that the F-bits and the M-bits do not indicate an unframed format, then the implication is that the DS3 signal is either of a C-Bit frame format or an M23 frame format. As such, in step 312, an AIC bit is obtained from the DS3 signal or, more specifically, the current frame of a DS3 signal. Once the AIC bit is obtained, it is determined in step 314 if the AIC bit indicates that the frame is of a C-Bit format. When it is determined that the AIC bit indicates that the frame is of a C-Bit format, the signal is processed in step 316 as having a C-Bit format, and the process of determining the DS3 frame format is completed. Alternatively, if it is determined that the AIC bit does not indicate that the frame is of a C-Bit format, then the frame is generally assumed to be of an M23 format. Hence, the signal is processed as having an M23 format in step 320, and the process of determining the DS3 frame format is completed.

Although using AIC bits to determine whether a DS3 signal has a C-Bit frame format, an M23 frame format, or an unframed format may be effective, the use of only the AIC bits may result in an inaccurate determination of a frame format. Legacy equipment, or equipment that was deployed before DS3 signal standards were ratified, and other equipment that is not standards compliant with respect to DS3 signals may use bits in a DS3 frame in a non-standards compliant manner. In some cases, equipment that is not DS3 signal compliant may set bits in a frame such that the first C-bit in the frame may not be an AIC bit, and may instead be used as a payload bit. As will be appreciated by those skilled in the art, the first C-bit in a frame is an AIC bit when the frame is of a C-Bit format. When the first C-bit in a frame is not an AIC bit, if the first C-bit is used substantially alone to determine a frame format, the determined frame format may be inaccurate. By way of example, a frame of an M23 frame format generally includes many values of '1' in its payload. Hence, if the first C-bit in the frame is used as a payload bit and holds a payload value of '1,' the M23 frame may be incorrectly identified as being of a C-bit frame format. When a frame is in a channelized M23 mode, i.e., when the frame is associated with DS1 signals that are combined to make a DS3 signal as opposed to being unchannelized with the payload of the frame being used in bulk, the first C-bit may be used as a stuff control bit, which may have a value of '1.' When the frame format of a signal is incorrectly identified, a port that receives the signal may not be provisioned properly, and data contained in the signal may be improperly interpreted or reduced.

Many networks include legacy devices from a DS3 signal standpoint, devices which comply with DS3 standards, and devices which do not comply with DS3 standards. Since DS3 standards compliance varies from device to device in such networks, some signals within the network may have an AIC bit which is arranged to identify whether a signal is of a C-Bit frame format or an M23 frame format, while other signals may not actually have an AIC bit.

Referring to FIG. 4, a network which includes legacy DS3 devices, non-standards compliant DS3 devices, and standards compliant DS3 devices will be described. A network 400 includes devices 404*a-f*, e.g., routers. Devices 404 include standards compliant DS3 devices 404*a*, 404*b*, as well as a non-standards compliant DS3 device 404*d* and a legacy DS3 device 404*c*. When standards compliant DS3 device 404*a* sends a signal of a C-Bit frame format, the AIC bit of each frame in the signal will generally be set to a value of '1,' although it may be possible that by the time the signal is received, e.g., at standards compliant DS3 device 404*b*, due to bit errors, the AIC bit in one of the frames may be incorrect. As a result, standards compliant DS3 device 404*b* may incorrectly identify the frame format of the received signal.

Further, as previously mentioned, legacy device 404*c* and non-standards compliant device 404*d* may transmit DS3 signals with frame formats that may not be accurately identified. Since the determination of the frame format of DS3 signals is typically based on fixed overhead bits such as an AIC bit, when the overhead bits are not set according to ratified standards for different frame formats, incorrect determinations of a frame format are likely to occur.

Overhead bits within a DS3 frame of a particular frame format may be inconsistent with that frame format due to at least some of the overhead bits not being used in an expected manner. As discussed above, some devices may store payload information in bits which are typically designated as being overhead bits. When bits in a frame which are expected to be overhead bits are not actually used as overhead bits, a device which receives the frame may falsely trigger a frame format, e.g., an M23 frame may incorrectly be detected as a C-Bit frame.

In addition, transmission errors may cause even overhead bits which are used in an expected manner to be incorrectly received. By way of example, transmission errors may cause an AIC bit in a frame to be changed from one value to another, thereby causing the wrong frame format to be detected.

Therefore, what is needed is a method and an apparatus which allows DS3 frame formats to be more accurately determined. That is, what is needed is a robust system which increases the likelihood that DS3 frame formats may be accurately detected, particularly in systems which may be subject to transmission errors, and include either or both legacy DS3 equipment and non-standards compliant DS3 equipment.

SUMMARY OF THE INVENTION

The present invention relates to a system and a method for identifying a frame format associated with a DS3 data signal. According to one aspect of the present invention, a method for detecting a frame format of a signal which has a plurality of frames includes receiving a first frame and determining when a parity associated with the first frame and a first bit associated with the first frame indicate that a first counter is to be incremented. The first counter is incremented when it is determined that the first counter is to be incremented. The method also includes determining when the signal is of a first format through a comparison of the first counter with a first threshold.

In one embodiment, the method also includes determining when the signal is of a second format when it is determined that the signal is not of the first format, wherein determining when the signal is of the second format includes comparing the first counter to a second threshold, and identifying the signal as being of a third format when it is determined that the signal is not of the second format. In such an embodiment, the first format, the second format, and the third format are all different formats, and the different formats include an unknown format, a C-Bit format, and an M23 format.

Using the parity of frames in a DS3 signal in addition to overhead bits in the determination of a frame format of the DS3 signal enables the frame format to be more accurately determined, as the effect of a non-standard use of C-bits may be minimized, e.g., a fixed pattern of ones which is included in the first C-bit of a frame is less likely to cause the format of the frame to be incorrectly identified. Further, when legacy or non-standards compliant equipment sends DS3 signals, the effect of a non-standard use of bits in the frame may be reduced. As a result, errors associated with incorrectly detecting a frame format of a DS3 signal and, hence, improperly provisioning a port on which the DS3 signal is received, may be reduced.

According to another aspect of the present invention, a method for detecting a frame format of a signal includes determining a parity for each frame of a plurality of frames, and identifying a frame format associated with the signal using the parity of each frame and a first bit associated with each frame. In one embodiment, the signal is a DS3 signal, and the first bit associated with each frame is a first C-bit.

According to still another aspect of the present invention, a frame format detection mechanism that is used in a network within which a data signal which includes a first frame is arranged to be transmitted includes means or code devices that determine a parity associated with the payload bits, and means or code devices that process the parity and the overhead bits to generate a first set of information. The mechanism also includes means or code devices that use the first set of information to create a state machine, wherein the state machine is arranged to identify a frame format associated with the data signal. In one embodiment, the data signal is a DS3 signal, and the means or code devices that process the parity and the overhead bits include means or code devices that process the parity and a first overhead bit, wherein the first overhead bit is an application identification bit.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

To accurately provision or configure a port of a DS3 line card, or substantially any port which receives DS3 signals, the frame format of a signal that is to be received by the port generally must be determined. Due to transmissions errors and the behavior of equipment which does not adhere to ratified DS3 standards, the frame formats of some signals may not be accurately detected using convention methods such as methods which base the identification of frame formats on fixed overhead bits such as an application identification (AIC) bit.

By using overhead bits in addition to payload bits of frames in a DS3 frame, the frame format of a DS3 signal may be more accurately determined, since the effect of transmission errors may be minimized, and the effect of the non-standard use of bits in the frame may be reduced. Calculating the parity of a DS3 frame, and comparing the parity of the DS3 frame with certain bits, e.g., C-bits and P-bits, in the frame provides information which may be used in addition to the status of an AIC bit to create a state machine. The state machine, which may rely on binomial probability theory, may be used to identify the most likely frame format associated with a DS3 signal. Hence, errors associated with incorrectly detecting a frame format of a DS3 signal and, as a consequence, improperly provisioning a port on which the DS3 signal is received, may be reduced.

Figure 5:
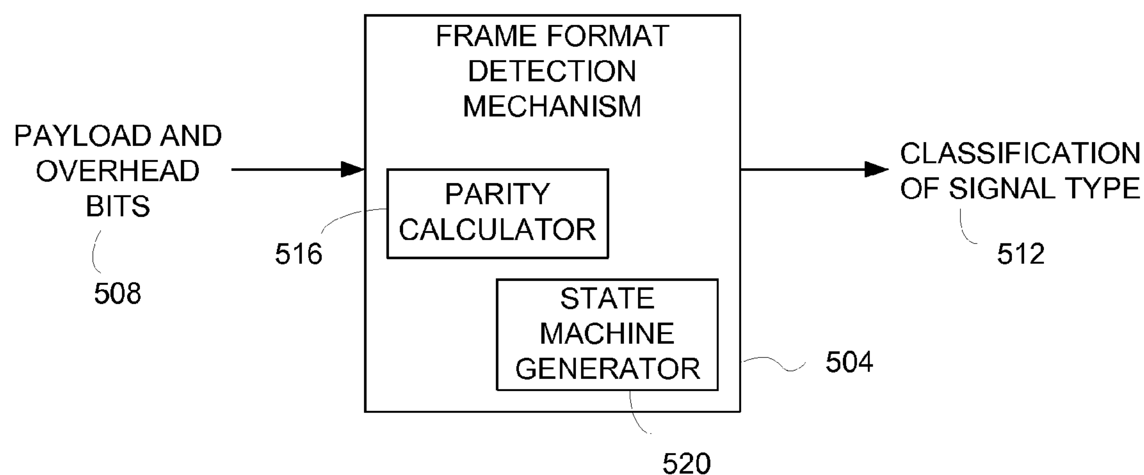
FIG. 5 is a block diagram which illustrates a process of identifying a frame format of a DS3 signal using payload bits and overhead bits in accordance with an embodiment of the present invention.

FIG. 5 is a block diagram which illustrates a process of identifying a frame format of a DS3 signal using payload bits and overhead bits in accordance with an embodiment of the present invention. A frame format detection mechanism 504, which may be a part of a line card associated with a router (not shown), is arranged to accept payload and overhead bits 508 of a plurality of frames of a DS3 signal. Frame format detection mechanism 504 includes a parity calculator which determines the parity of a given frame using payload and overhead bits 508 of the given frame. Frame format detection mechanism 504 also includes a state machine generator 520 which uses information provided by parity calculator 516 and an AIC bit included in payload and overhead bits 508 to create a state machine which enables frame format detection mechanism 504 to determine a signal type classification 512.

State machine generator 520 may include a statistical generator, or may have access to a statistical generator, which enables state machine generator 520 to determine appropriate thresholds based upon historical data. By way of example, state machine generator 520 may use historical data to determine a threshold value to use in effectively determining what percentage of frames which have a given AIC bit value and a parity value are to be received before the frames are detected as being of one format as opposed to another format. In other words, state machine generator 520 may construct a state machine which identifies a frame format of a DS3 signal based upon the likelihood that a series of received frames are of a particular format. Such a state machine is configurable via the different thresholds that may be applied. Typically, state machine generator 520 constructs a single state machine which may have different states that ultimately reflect what frame format has been detected or deduced.

Frame format detection mechanism 504, in the described embodiment, may classify a signal as being of a C-Bit frame format, an M23 frame format, or an unknown frame format. That is, signal type classifications 512 may include a C-Bit frame format classification, an M23 frame format classification, and an unknown frame format classification. An unknown frame format classification may effectively cover a C-Bit frame format, an M23 frame format, and an unframed frame format. In other words, when a signal is classified as having an unknown frame format, the indication is generally that frame format detection mechanism 504 is substantially unable to determine whether the signal is of a C-Bit frame format, an M23 frame format, or an unframed frame format.

Figure 6A:
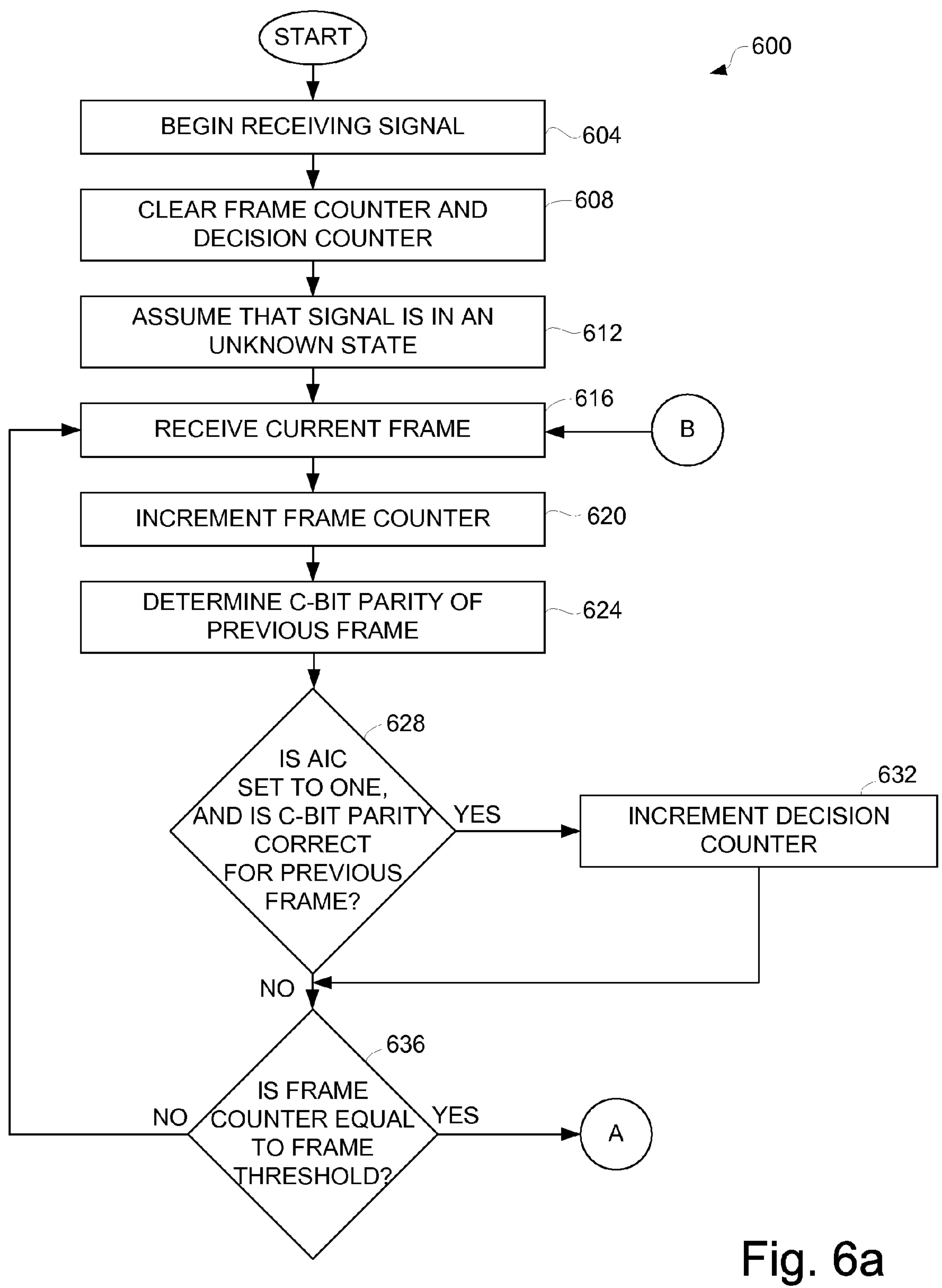
FIGS. 6*a* and 6*b* are a process flow diagram which illustrates the steps associated with one method of detecting a frame format of a DS3 signal in accordance with an embodiment of the present invention.
Figure 6B:
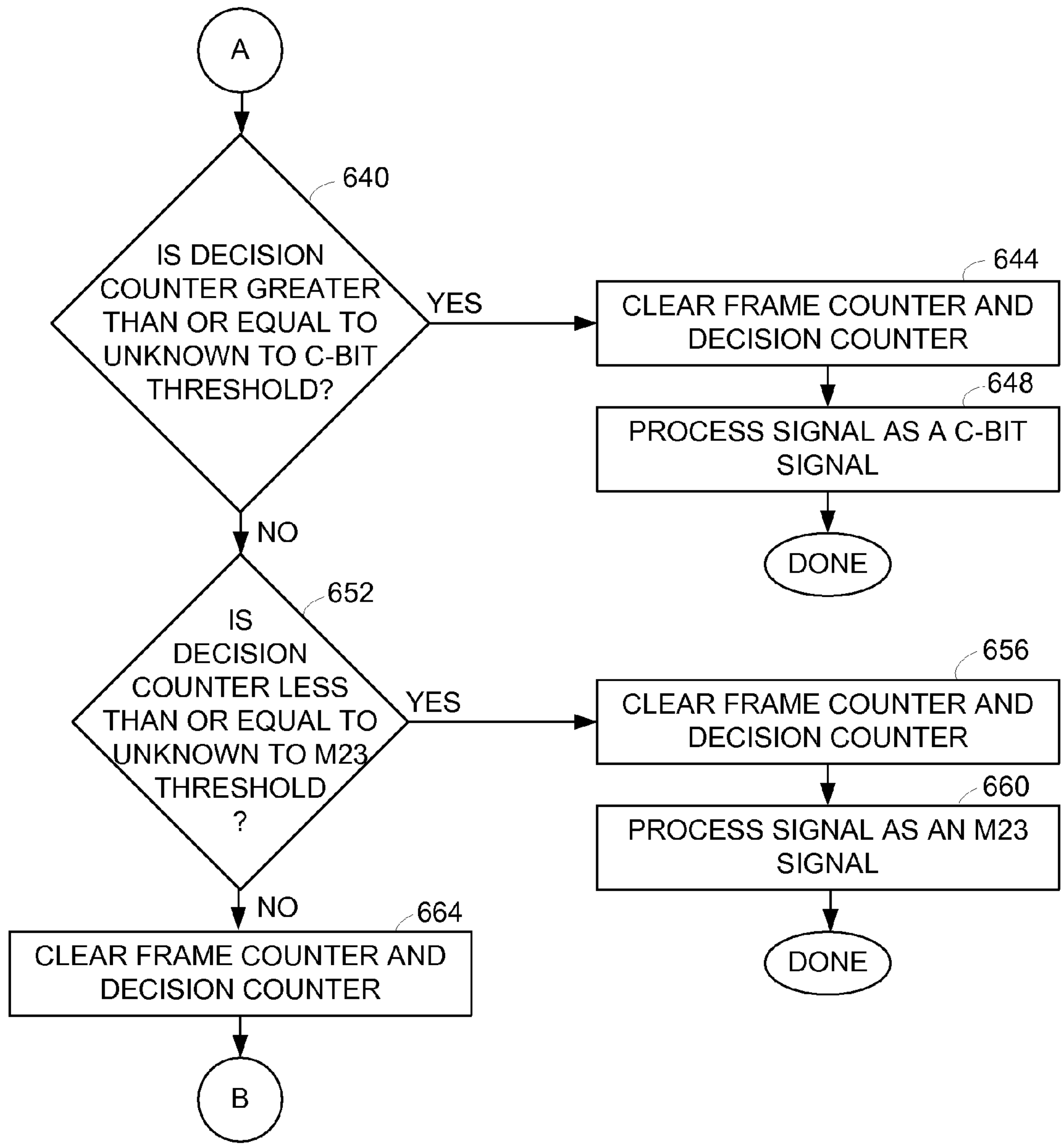

When a router receives a signal, frame format detection mechanism 504 may process the signal to detect the frame format of the signal. With reference to FIGS. 6*a* and 6*b*, one method of determining a state or a frame format of a DS3 signal of an unknown state or frame format will be discussed in accordance with an embodiment of the present invention. A process 600 of identifying the frame format of a DS3 signal begins at step 604 in which a signal is received, e.g., on a port of a line card that is installed in a router. Once the signal begins to be received, a frame counter and a decision counter are cleared in step 608. The frame counter is generally arranged to indicate a number of frames which have been processed in order to determine the format, i.e., a current format, of the signal, while the decision counter is essentially arranged to count the number of frames which meet a decision criterion, as will be discussed below.

After the frame counter and the decision counter are cleared, or initialized, an assumption is made in step 612 that the signal is in an unknown state, i.e., of an unknown frame format. Then, in step 616, a current frame is received. Once the current frame is received, the frame counter is incremented in step 620, and the parity of the current frame is determined in step 624. Determining the C-bit parity of the current frame generally includes a binary summing up of the payload to either a one or a zero value. The calculated parity may then be compared to the C-bits which typically indicate parity in a C-Bit frame format. In a standard frame, e.g., the frame shown in FIG. 1, the three C-bits in the third row of a frame are the C-bits which typically indicate parity in a C-Bit frame format.

Figure 1:
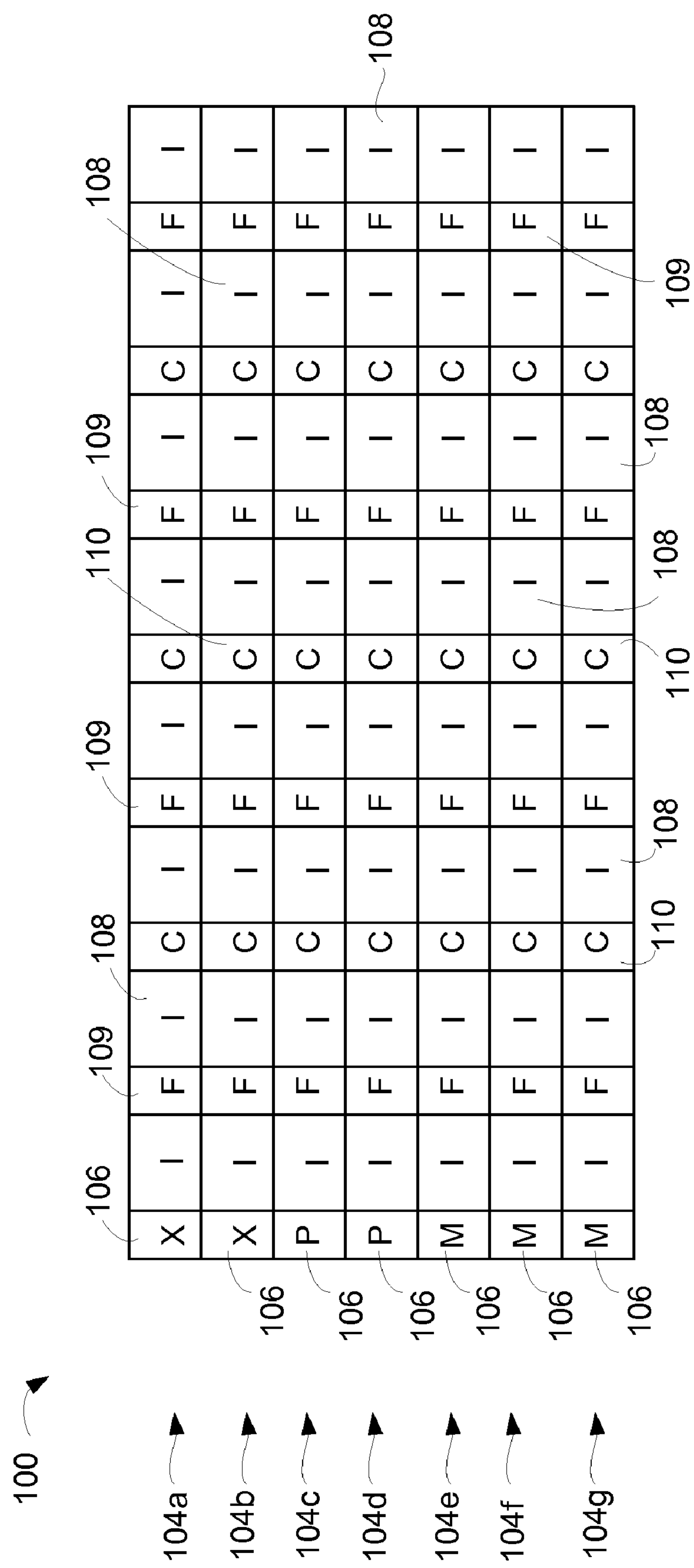
FIG. 1 is a diagrammatic representation of a DS3 frame.
Figure 2:
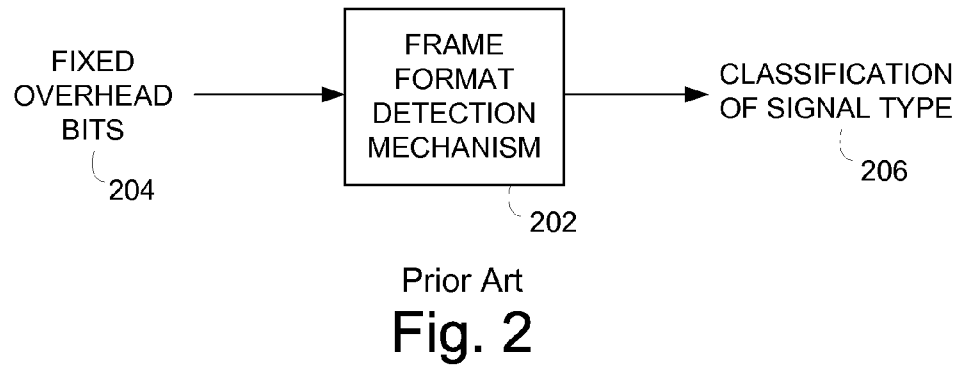
FIG. 2 is a block diagram which illustrates a process of identifying a frame format of a DS3 signal.
Figure 4:
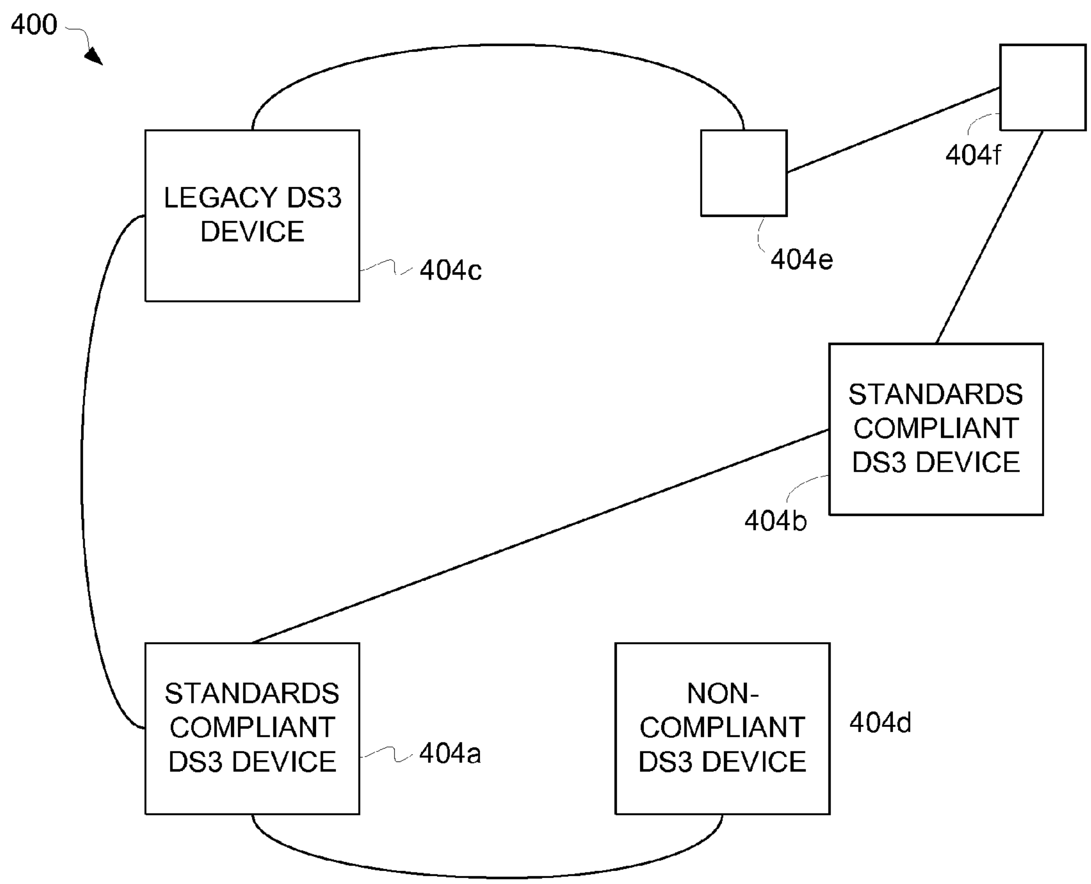
FIG. 4 is a diagrammatic representation of a conventional network through which DS3 signals may be sent.
Figure 3:
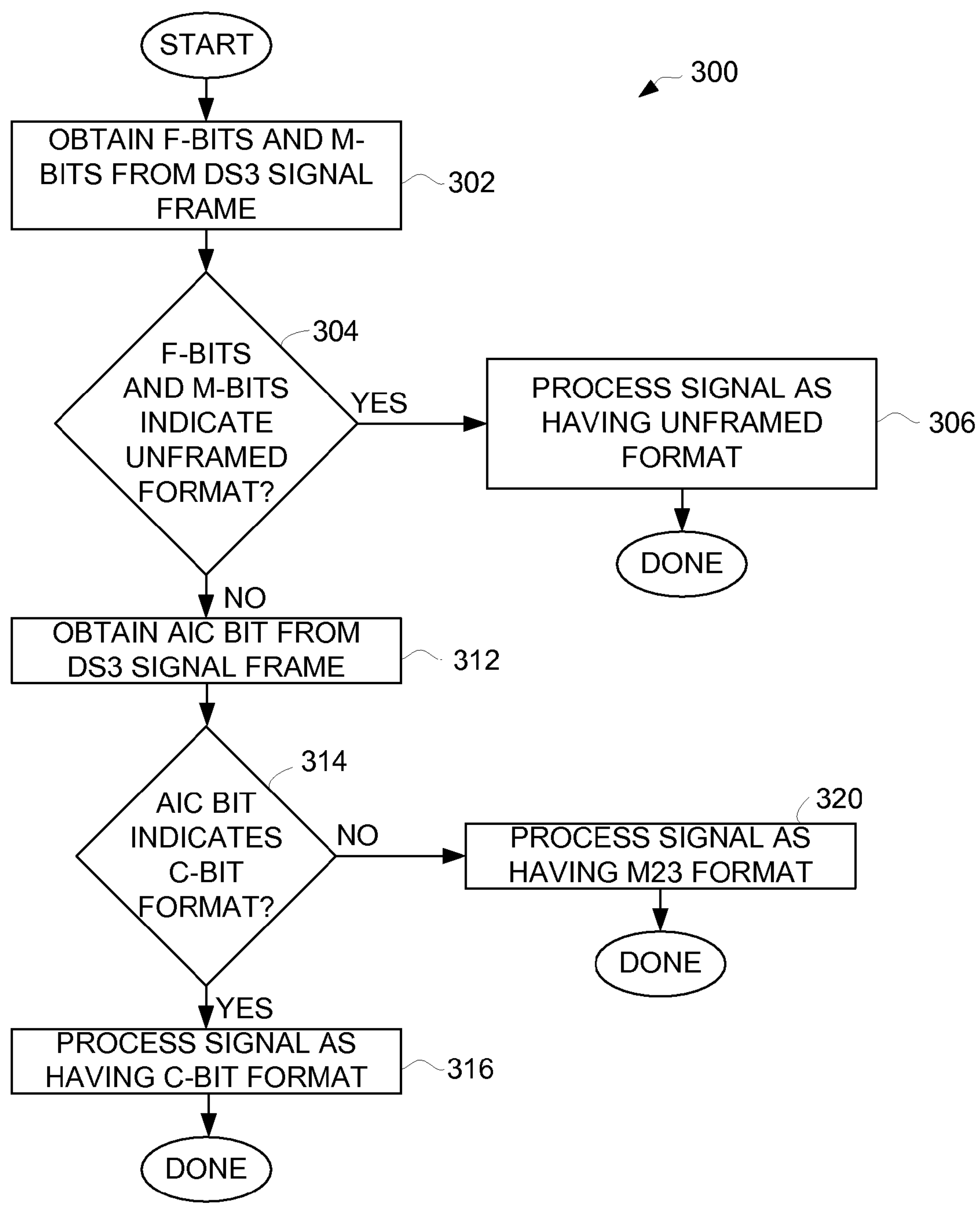
FIG. 3 is a process flow diagram which illustrates the steps associated with a conventional method of identifying a DS3 frame format.

It is determined in step 628 whether the AIC bit in the current frame is set to a value of one, in addition to the C-bit parity for the current frame being correct. In other words, in step 628, a determination is made regarding whether the AIC bit of the current frame is set to a value of one and whether the C-bit parity of the current frame indicates a C-Bit frame format, i.e., whether the calculated parity matches the C-bits in the third row of a frame as shown in FIG. 1. When it is determined that the AIC bit of the current frame is set to a value of one and that the C-bit parity is correct for the current frame, then the decision counter is incremented in step 632.

Once the decision counter is incremented in step 632, or if the determination in step 628 is that either the AIC bit of the current frame is not set to one or the C-bit parity is not correct for the current frame, process flow proceeds to step 636 in which it is determined if the frame counter is substantially equal to a frame threshold. A frame threshold may be an adjustable value which corresponds to the number of frames which are processed before a decision is made regarding the frame format of the signal. In one embodiment, the frame threshold may be two hundred and fifty six, which indicates that two hundred and fifty six frames are processed before a determination of a current frame format is made. It should be appreciated that the frame threshold may be widely varied depending upon the requirements of a particular system. That is, the frame threshold may have substantially any suitable value.

If it is determined in step 636 that the frame counter is not substantially equal to the frame threshold, then process flow returns to step 616 in which a current frame is received. Alternatively, if it is determined in step 636 that the frame counter is substantially equal to the frame threshold, then the indication is that a decision regarding a frame format may be made. Accordingly, in step 640 in FIG. 6B, a decision is made as to whether the decision counter has a value that is greater than or substantially equal to an "unknown to C-Bit threshold." The unknown to C-Bit threshold is a value which may be considered to be a trigger that indicates whether the signal is more likely to be a C-Bit frame format than of an unknown frame format. When the decision counter has a value that is greater than such a threshold, the implication is that the signal is of a C-Bit frame format. It should be appreciated that the value associated with the unknown to C-Bit threshold may be determined based on substantially any suitable criterion including, but not limited to, historical data and data generated from probabilistic analysis.

If the decision counter is determined to be greater than or substantially equal to the unknown to C-Bit threshold, then the frame counter and the decision counter are cleared, or otherwise reset, in step 644. Once the frame counter and the decision counter are cleared, the signal is received or processed as being a C-Bit signal in step 648. One method of processing the signal as a signal which has a C-Bit frame format will be described below with reference to FIGS. 8*a* and 8*b*. Once the signal is processed as a C-Bit signal, the process of identifying a frame format is completed.

Returning to step 640, if it is determined that the decision counter has a value that is not greater than or substantially equal to the unknown to C-Bit threshold, then in step 652, a determination is made regarding whether the decision counter has a value that is less than or substantially equal to an "unknown to M23 threshold." The unknown to M23 threshold is generally a trigger value which indicates whether the signal is more likely to be of an M23 frame format than of an unknown frame format. In general, the value associated with the unknown to M23 threshold may vary. When it is determined that the decision counter has a value that is not less than or substantially equal to the unknown to M23 threshold, the indication is that the frame format of the signal is most likely an unknown format. As such, in step 664, the frame counter and the decision counter are cleared, and process flow returns to step 616 in which a current frame is received.

Alternatively, if it is determined in step 652 that the decision counter has a value that is less than or substantially equal to the unknown to M23 threshold, then the indication is that the signal most likely has an M23 frame format. Hence, the frame counter and the decision counter are cleared in step 656, and the signal is processed as an M23 signal, or a signal with an M23 frame format, in step 660. The steps associated with one method of processing a signal that has been identified as having an M23 frame format will be discussed below with respect to FIGS. 7*a* and 7*b*. Once the signal is processed as having an M23 frame format, the process of detecting a frame format is completed.

Figure 7A:
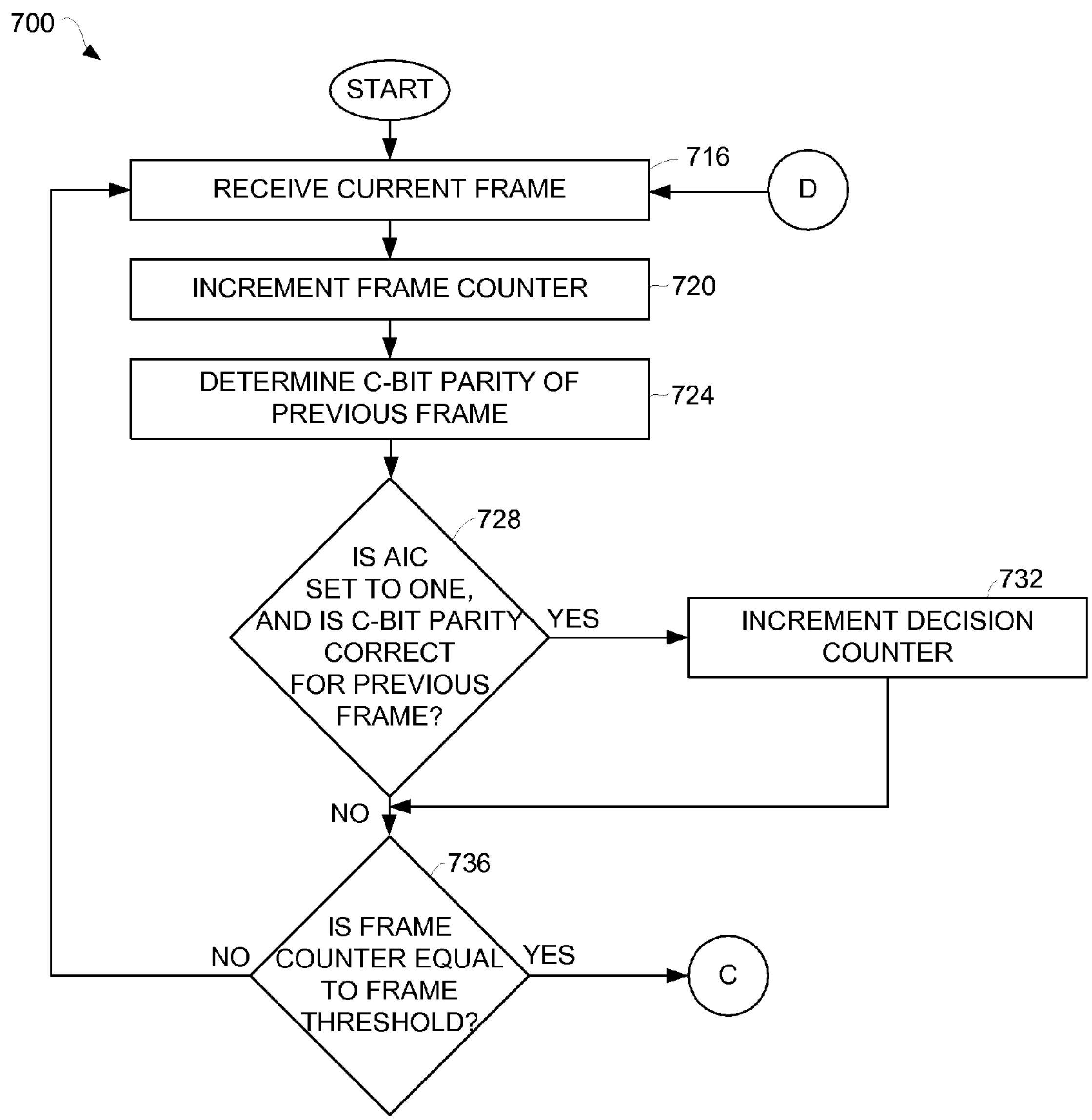
FIGS. 7*a* and 7*b* are a process flow diagram which illustrates the steps associated with one method of processing a DS3 signal that has previously been identified as having an M23 frame format in accordance with an embodiment of the present invention.
Figure 7B:
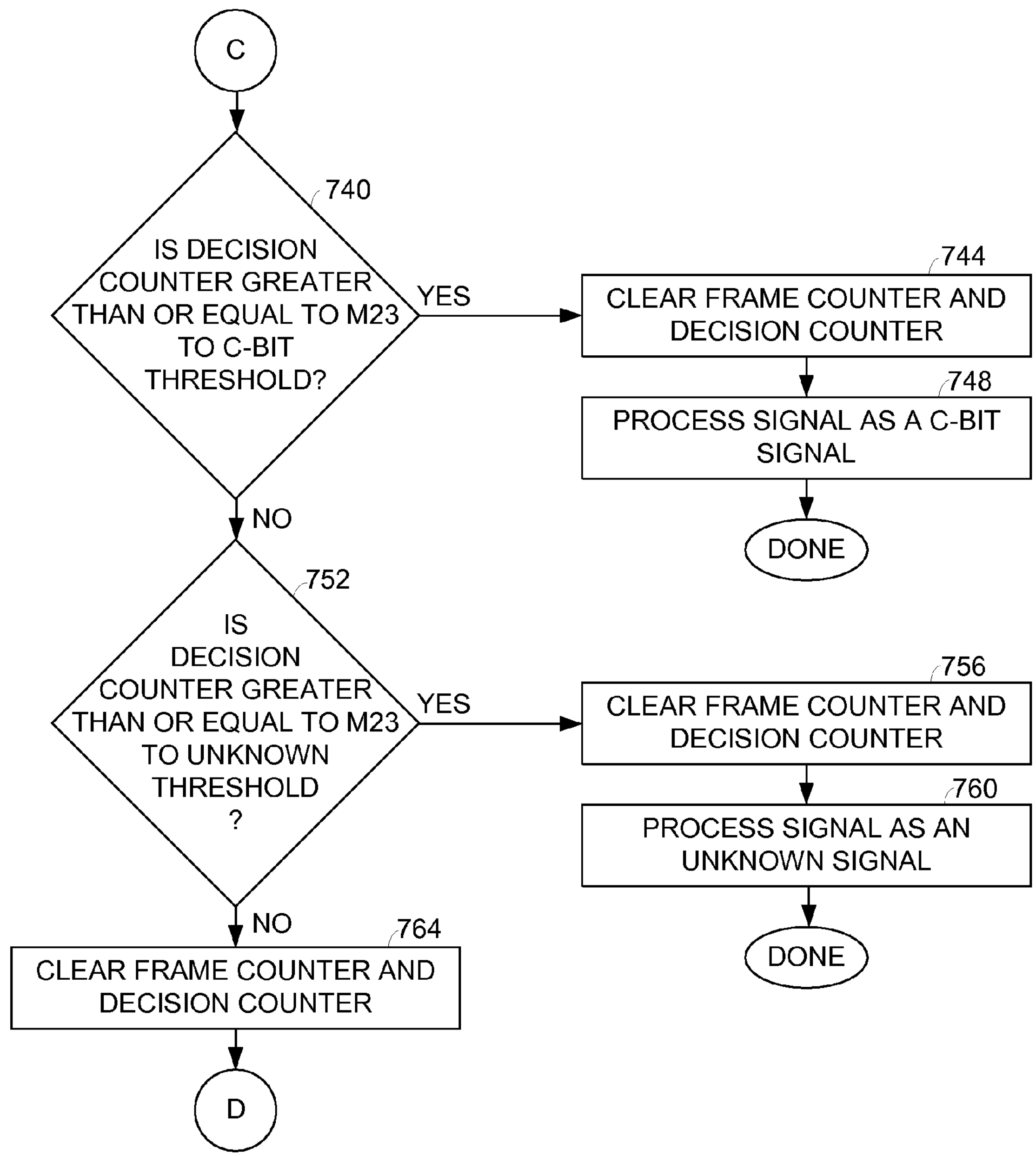

FIGS. 7*a* and 7*b* are a process flow diagram which illustrates the steps associated with one method of processing a DS3 signal that has previously been identified as having an M23 frame format in accordance with an embodiment of the present invention. A process 700 begins in step 716 in which the current frame of a signal which has been identified as having an M23 frame format is received. Once the current frame is received, the frame counter is incremented in step 720. Then, the parity of the current frame is determined in step 724.

From step 724, process flow proceeds to step 728 in which it is determined whether the AIC bit in the current frame is set to a value of one and, further, if the C-bit parity for the current frame is correct, or otherwise consistent with a C-Bit frame format. When it is determined that the AIC bit of the current frame is set to a value of one and that the C-bit parity is correct for the current frame, then the decision counter is incremented in step 732. Once the decision counter is incremented, a determination is made in step 736 as to whether the frame counter has a value that is substantially equal to a frame threshold. If the determination in step 728 is that either the AIC bit of the current frame is not set to one or the C-bit parity is not correct for the correct frame, process flow also proceeds to step 736.

If it is determined in step 736 that the frame counter has a value that is not substantially equal to the frame threshold, then process flow returns to step 716 in which a current frame is received. Alternatively, if it is determined in step 736 that the frame counter has a value that is substantially equal to the frame threshold, then the indication is that a decision regarding a frame format may be made. Hence, in step 740, a decision is made as to whether the decision counter has a value that is greater than or substantially equal to an "M23 to C-Bit threshold." When the decision counter has a value that is greater than or substantially equal to the M23 to C-Bit threshold, which may be set based upon historical information or probabilistic analysis, then the implication is that the signal is more likely to be of a C-Bit frame format than of an M23 frame format. Hence, the frame counter and the decision counter are cleared, or otherwise reset, in step 744, and the signal is processed as being a C-Bit signal, or a signal of a C-Bit frame format, in step 748. The processing of the signal as a signal which has a C-Bit frame format will be described below with reference to FIGS. 8*a* and 8*b*. After the signal is processed as a C-Bit signal, the processing of a signal that was previously identified as being of an M23 frame format is completed.

Referring back to step 740, if it is determined that the decision counter has a value that is not greater than or substantially equal to the M23 to C-Bit threshold, then in step 752, a determination is made regarding whether the decision counter has a value that is greater than or substantially equal to an "M23 to unknown threshold." When the decision counter is greater than or approximately equal to the M23 to unknown threshold, the signal is generally more likely to be of an unknown frame format than of an M23 frame format. When it is determined that the decision counter has a value that is not greater than or substantially equal to the M23 to unknown threshold, the indication is that the frame format of the signal is most likely still of an M23 frame format. As such, in step 764, the frame counter and the decision counter are cleared, and process flow returns to step 716 in which a current frame is received.

Alternatively, if it is determined in step 752 that the decision counter has a value that is greater than or substantially equal to the M23 to unknown threshold, then the indication is that the signal is most likely of an unknown frame format. Hence, the frame counter and the decision counter are cleared in step 756, and the signal is processed as an unknown signal, or a signal with an unknown frame format, in step 760. In one embodiment, the processing a signal that has been identified as having an unknown frame format corresponds to the method described above with respect to FIGS. 6*a* and 6*b*, beginning with step 616. Once the signal is processed as having an unknown frame format, the processing of a signal that has previously been identified as having an M23 frame format is completed.

Figure 8A:
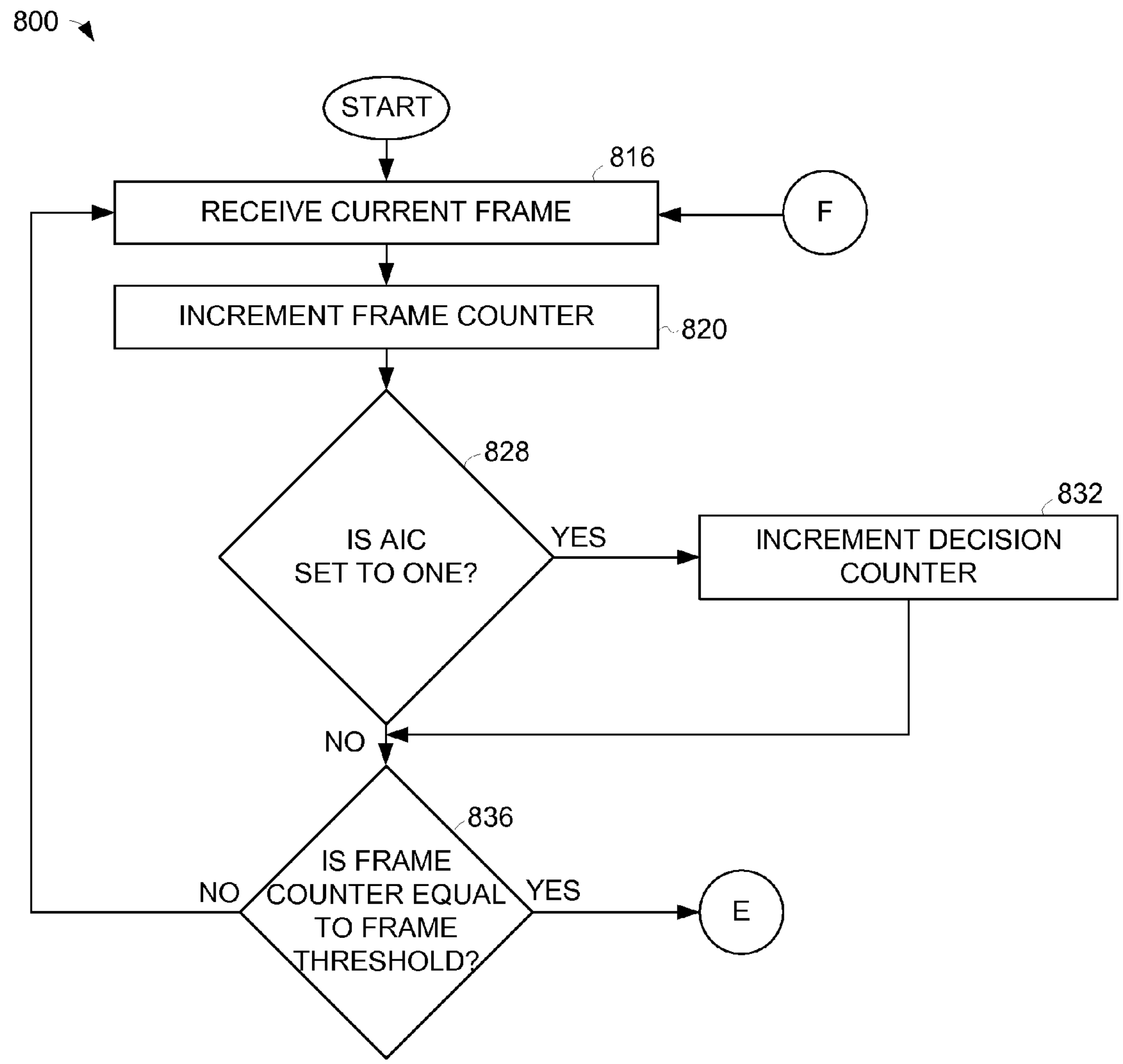
FIGS. 8*a* and 8*b* are a process flow diagram which illustrates the steps associated with one method of processing a DS3 signal that has previously been identified as having a C-Bit frame format in accordance with an embodiment of the present invention.
Figure 8B:
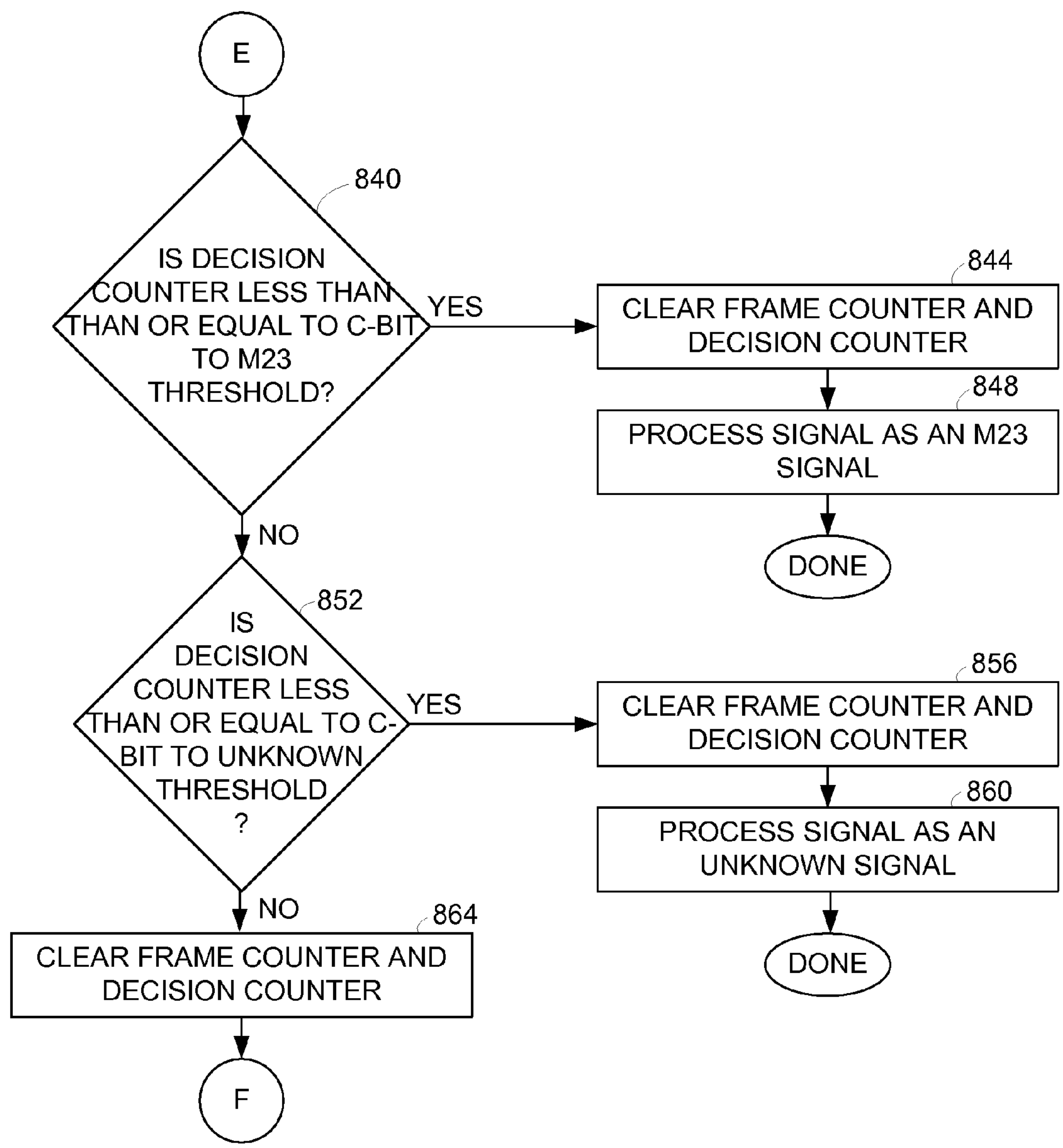

With reference to FIGS. 8*a* and 8*b*, the steps associated with one method of processing a DS3 signal that has previously been identified as having a C-Bit frame format will be described in accordance with an embodiment of the present invention. A process 800 of processing a signal that has been identified as having a C-Bit frame format begins at step 816 in which a current frame is received. A frame counter is incremented in step 820 prior to a determination in step 828 regarding whether the AIC bit of the current frame is set to a value of one. Typically, a DS3 signal that is sent by a standards compliant device will set the AIC bit to a value of one in frames when the signal is of a C-Bit frame format.

When it is determined in step 828 that the AIC bit has a value of one, a decision counter is incremented in step 832. Once the decision counter is incremented, process flow moves to step 836 in which it is determined if the frame counter is substantially equal to a frame threshold. In the described embodiment, when the determination in step 828 is that the AIC bit is not set to a value of one, process flow proceeds directly to step 836 from step 828.

If the determination in step 836 is that the frame counter has a value that is not substantially equal to the frame threshold, process flow returns to step 816 in which a current frame is received. Alternatively, if the frame counter is determined to have a value that is substantially equal to the frame threshold, a determination is made in step 840 in FIG. 8*b* as to whether the decision counter has a value that is less than or substantially equal to a "C-Bit to M23 threshold." When it is determined that the decision counter has a value that is less than or substantially equal to the C-Bit to M23 threshold, then the signal is generally more likely to be of an M23 frame format than of a C-Bit frame format. Accordingly, in step 844, the frame counter and the decision counter are cleared or substantially reinitialized. Once the frame counter and the decision counter are cleared, the signal is processed as an M23 signal in step 848. The processing of a signal as an M23 signal, or a signal with an M23 frame format, was previously discussed with respect to FIGS. 7*a* and 7*b*. The processing of a signal which has previously been identified as having a C-Bit frame format is completed after the signal is processed in step 848.

When it is determined in step 840 that the decision counter has a value that is greater than the C-Bit to M23 threshold, then it is determined in step 852 whether the decision counter has a value that is less than or substantially equal to a "C-Bit to unknown threshold." If the decision counter has a value that is less than or substantially equal to the C-Bit to unknown threshold, the frame counter and the decision counter are cleared in step 856, and the signal is considered to be more likely to be of an unknown frame format than of a C-Bit frame format. Hence, in step 860, the signal is processed as having an unknown frame format. In one embodiment, the processing a signal that has been identified as having an unknown frame format corresponds to the method described above with respect to FIGS. 6*a* and 6*b*, beginning with step 616. After the signal is processed as having an unknown frame format, the processing of a signal that has previously been identified as having a C-Bit frame format is completed.

Alternatively, if it is determined in step 852 that the decision counter has a value that is greater than the C-Bit to unknown threshold, then the signal is most likely still of a C-Bit frame format. Hence, the frame counter and the decision counter are cleared in step 856, and process flow returns to step 816 in which a frame, i.e., the new current frame, is received.

Figure 9:
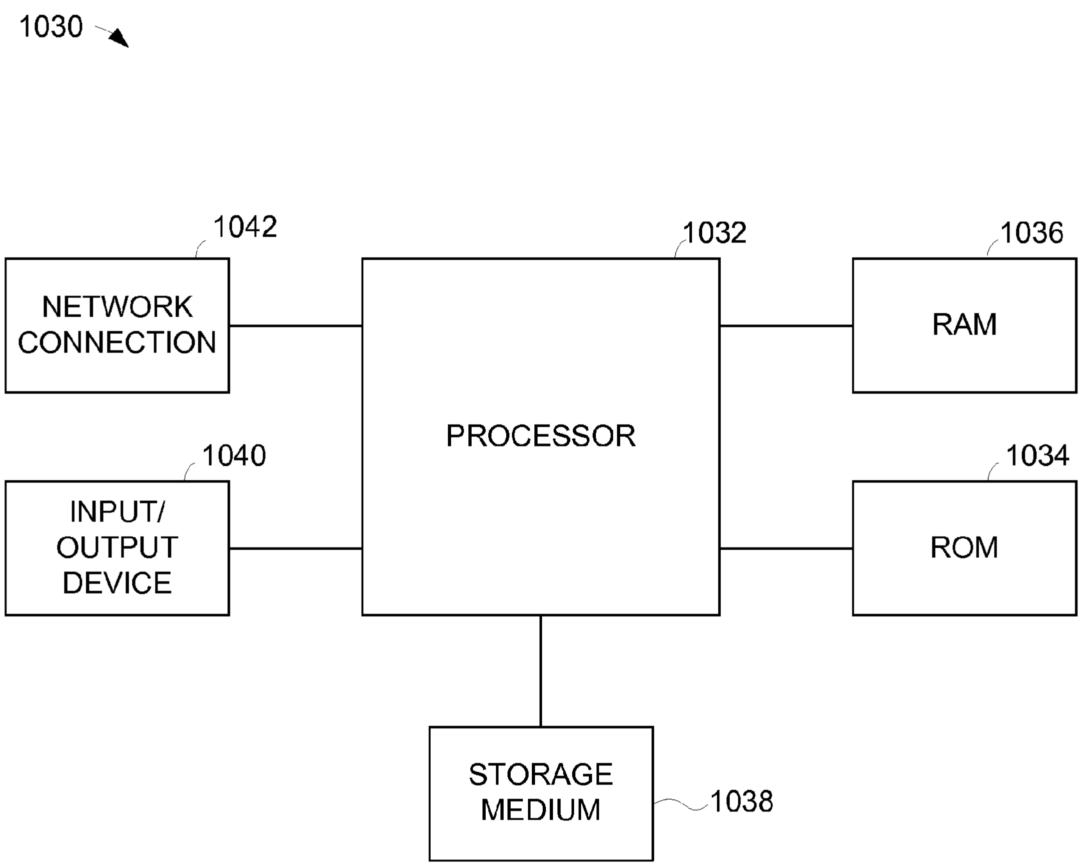
FIG. 9 is a representation of a computing device which is suitable for implementing the present invention.

FIG. 9 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to CPU 1032. In one embodiment, a special purpose hardware component which interfaces with CPU 1032 is used to detect a DS3 frame format.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the criteria used in determining whether a signal is of an unframed format, an M23 format, or a C-Bit format may vary. The various thresholds used to characterize whether a signal which was previously classified as being of one frame format has changed to being classified as being or another frame format may vary. Depending upon the type of probabilistic analysis used, and historical data, the thresholds may be adjusted to increase the likelihood that the correct frame format has been detected. In addition, as mentioned above, the number of frames which are processed before a frame format is updated may also vary.

A device which detects a frame format of a signal is typically coupled to, or in communication with, a port, e.g., a frame format detection mechanism may be a part of a line card which includes a port or several ports. In one embodiment, such a device may instead be coupled to a line or a communications link without departing from the spirit or the scope of the present invention.

While a hardware device may be used to execute a frame format detection algorithm, a frame format detection algorithm may also be executed in software. By way of example, a hardware device may extract information from frames, and a computing device may execute software associated with a frame format detection algorithm to determine the frame format associated with the frames. The use of a hardware device to extract information and to execute a frame format detection algorithm generally allows for a faster polling or sampling rate. However, for an embodiment in which a slower polling rate is acceptable, both a data extraction algorithm and a frame format detection algorithm may be executed in software.

In general, the steps associated with methods of detecting a frame format and provisioning a monitored port may be widely varied. Steps may be added, removed, altered, or reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for detecting a frame format of a signal, the signal including a plurality of frames, the method comprising:

receiving a first frame included in the plurality of frames;

determining when a parity associated with the first frame and a first bit associated with the first frame indicate that a first counter is to be incremented;

incrementing the first counter when it is determined that the first counter is to be incremented;

determining when the signal is of a first format, wherein the determining includes comparing the first counter to a first threshold;

determining when the signal is of a first format, the first format is one of an unknown format, a C-Bit format, and an M23 format, wherein the determining includes comparing the first counter to a first threshold;

determining when the signal is of a second format when it is determined that the signal is not of the first format, the second format not of a same format as the first format but being one of the unknown format, the C-Bit format, and the M23 format, wherein determining when the signal is of the second format includes comparing the first counter to a second threshold; and identifying the signal as being of a third format when it is determined that the signal is not of the second format, the third format not of a same format as the first format and the second format but being one of the unknown format, the C-Bit format, and the M23 format.

2. The method of claim 1 further including incrementing a second counter when the first frame is received, wherein determining when the signal is of the first format includes determining whether the signal is of the first format when the counter is substantially equal to a frame threshold.

3. The method of claim 2 wherein the frame threshold is a number of frames used in detecting the frame format.

4. The method of claim 1 further including:

calculating the parity associated with the first frame; wherein calculating the parity associated with the first frame includes obtaining payload bits associated with the first frame.

5. The method of claim 4 wherein the first bit associated with the first frame is a first C-bit associated with the first frame, the first frame being a DS3 frame.

6. The method of claim 1 wherein the signal is a DS3 signal.

7. On at least one computer-readable storage medium storing computer-executable instructions, a set of computer-executable instructions for detecting a frame format of a DS3 signal wherein the signal being arranged to include a plurality of frames, comprising:

computer-executable instructions that cause a first frame included in the plurality of frames to be received;

computer-executable instructions that cause a determination that a parity associated with the first frame and a first bit associated with the first frame indicate that a first counter is to be incremented;

computer-executable instructions that cause the first counter to be incremented when it is determined that the first counter is to be incremented;

computer-executable instructions that cause a determination that the signal is of a first format wherein the first format is one of an unknown format, a C-Bit format, and an M23 format, including computer-executable instructions that cause the first counter to be compared to a first threshold;

computer-executable instructions that cause a determination that the signal is of a second format when it is determined that the signal is not of the first format but being one of the unknown format, the C-Bit format, and the M23 format, including computer-executable instructions that cause the first counter to be compared to a second threshold; and computer-executable instructions that cause the signal to be identified as being of a third format when it is determined that the signal is not of the second format wherein the third format is not of a same format as the first format and the second format, the third format being one of the unknown format, the C-Bit format, and the M23 format.

8. The computer-readable storage medium of claim 7 further including computer-executable instructions that cause a second counter to be incremented when the first frame is received, and wherein the computer-executable instructions that cause the determination that the signal is of the first format include computer-executable instructions that cause a determination of whether the signal is of the first format when the second counter is substantially equal to a frame threshold.

* * * * *